UNITED STATES PATENT OFFICE.

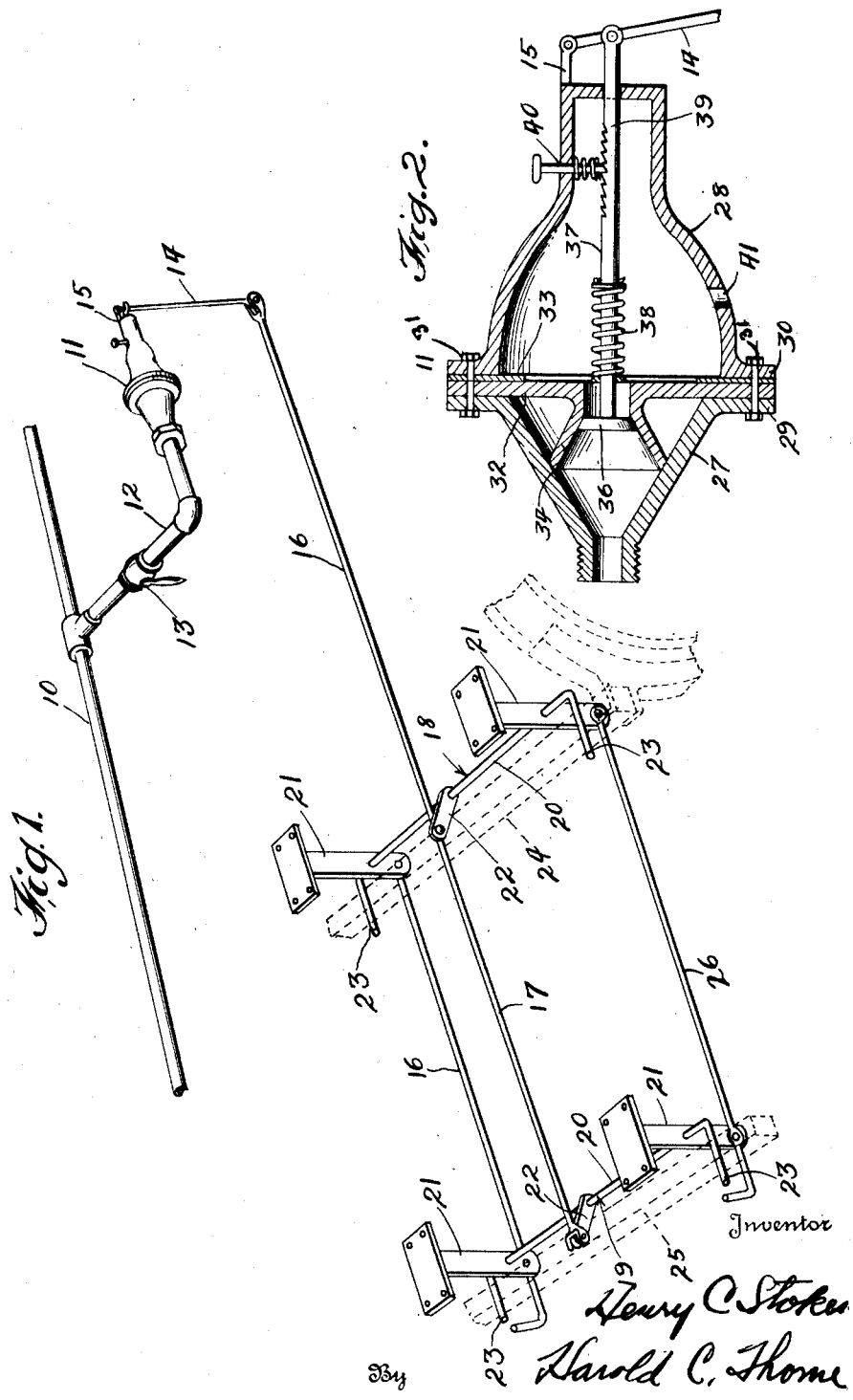

HENRY C. STOKES, OF SUMTER, SOUTH CAROLINA.

AIR-BRAKE SAFETY APPLIANCE.

1,385,160.　　　Specification of Letters Patent.　　Patented July 19, 1921.

Application filed September 29, 1920. Serial No. 413,508.

*To all whom it may concern:*

Be it known that I, HENRY C. STOKES, a citizen of the United States, residing at Sumter, in the county of Sumter and State of South Carolina, have invented certain new and useful Improvements in Air-Brake Safety Appliances, of which the following is a specification.

This invention relates to air brake safety appliances, and more particularly to means for applying the air brakes throughout the train in case any of the brakes or brake beams on any of the trucks should become displaced, and also to the provision of a frame structure mounted beneath the brake beams for preventing them from dropping below the trucks in case they should fall.

Another feature of the invention resides in the arrangement, and form of valve mechanism for letting air escape from the train pipe in case the brakes or brake beams should become displaced.

Further features and details of the invention will appear as described in connection with the accompanying drawings and hereinafter set forth and claimed.

Referring to the drawings forming a part of this specification, like numerals of reference designate corresponding parts in the figures, in which—

Figure 1 is a diagrammatic perspective view illustrating an application of my invention, and Fig. 2 is a longitudinal sectional view of a valve structure particularly adapted for use in connection with the system illustrated in Fig. 1.

In Fig. 1 of the drawings, the reference numeral 10 indicates a section of the usual train pipe employed in air brake systems, and 11 represents a valve which is connected with the train pipe by pipe 12 which may have a cut off cock 13.

A lever 14, pivoted to a projection 15 on valve 11, is connected with a link 16, which in turn is connected with link 17, and bell-crank levers 18 and 19.

The bell-crank levers, 18 and 19, each comprise pivot rods 20, carried by hangers 21, which are adapted to be supported on the car sills or in any desired manner. Lever arms 22, are mounted on the middle of these rods 20, for connecting them with the links 16 and 17, and on the outer ends of these rods are lever arms 23, normally horizontal and extending under the brake beams 24 and 25.

The hangers 21 also carry rods 26, which provide a frame structure for supporting the brakes and brake beams if they should fall.

The valve 11, heretofore referred to, is preferably made with a two part casing comprising castings 27 and 28. These castings each have flanges 29 and 30, which are fastened together by bolts 31 retaining the valve members 32 and 33 between them. The member 32 is apertured and provided with a conical member 34 fastened thereto or formed integral therewith, providing a seat for the valve 36 mounted on one end of the valve rod 37, which is connected with the lever 14, at its other end. The member 33 provides a bearing through which rod 37 can reciprocate, and the end of the casting 28 is apertured providing another bearing for rod 37. A valve spring 38 positioned on rod 37 rests against the bearing portion of member 33 for normally holding the valve member 36 seated in the conical member 34. Valve rod 37 is provided with ratchet teeth 39 which are engaged by a spring pressed pawl 40 for holding the valve 36 open after lever 14 has been actuated. An aperture 41 affords a vent for the valve member and is of such a size as will permit the air in the train pipe to escape slowly for effecting a gradual application of the brakes.

It will be apparent that if any of the brakes should drop the lever arms 23 would be tilted down and drag on the link 16 and lever 14 to operate the valve 11 for letting air out of the train pipe for applying the brakes, and the frame structure will support the members from falling to the ground. In case the links 16 or 17, or any of the operating mechanism should be broken during the operation, the spring pressed pawl 40, coöperating with ratchet 39, prevents the valve rod 37 from being retracted until the pawl member has been manually withdrawn by operation of the handle on top of the pawl. The cut off cock 13 can be used to prevent the escape of air in case valve 11 should become defective or inoperative.

Having shown and described one embodiment of my invention I do not desire to have it confined closely to the specific structure shown, it being understood that changes may be made in form, proportion, and organization of its various parts without departing from the spirit of the invention as indicated by the scope of the appended claims.

I claim:

1. In combination with a railway air brake system, a valve for exhausting air from the train pipe for actuating the system, levers comprising rods pivotally mounted adjacent to each brake beam of a truck having arms extending under the beams adjacent to the ends thereof and adapted to be actuated by the displacement of any of the brakes or brake beams, a valve actuating rod connected with said valve and extending to said levers, and arms on said pivoted rods connected with said actuating rod whereby said valve will be opened when said levers have been actuated.

2. A frame structure for brake beams comprising hangers, levers pivoted in said hangers having arms adapted to be actuated by the displacement of the brakes or brake beams, links connecting said levers with a valve in the train pipe of an air brake system, and frame rods carried by said hangers for supporting the brake beams in case they should fall from their normal position.

3. In combination with a railway air brake system, a valve for exhausting air from the train pipe for actuating the system, and provided with a casing, levers adapted to be actuated by the displacement of the brakes or brake beams connected with said valve for opening the same, and means within the valve casing for maintaining said valve open after it has once been actuated by said levers.

In testimony whereof I affix my signature.

HENRY C. STOKES.